Figure 1:
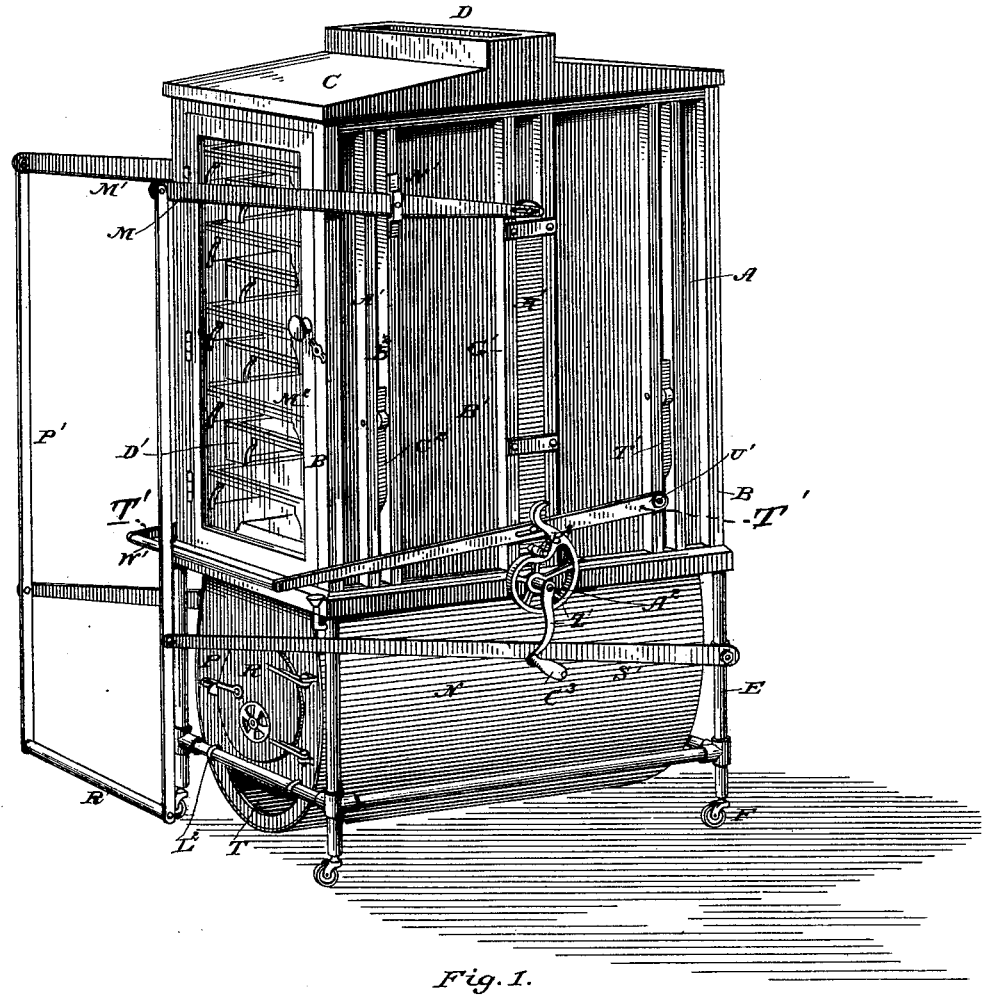

(No Model.) 2 Sheets—Sheet 1.

J. B. SWEETLAND.
Fruit Drier.

No. 233,298. Patented Oct. 12, 1880.

Attest:
R. F. Barnes
E. H. Bradford

Inventor:
Jerome B. Sweetland.
By J. H. Ennis
Atty.

(No Model.) 2 Sheets—Sheet 2.
J. B. SWEETLAND.
Fruit Drier.
No. 233,298. Patented Oct. 12, 1880.
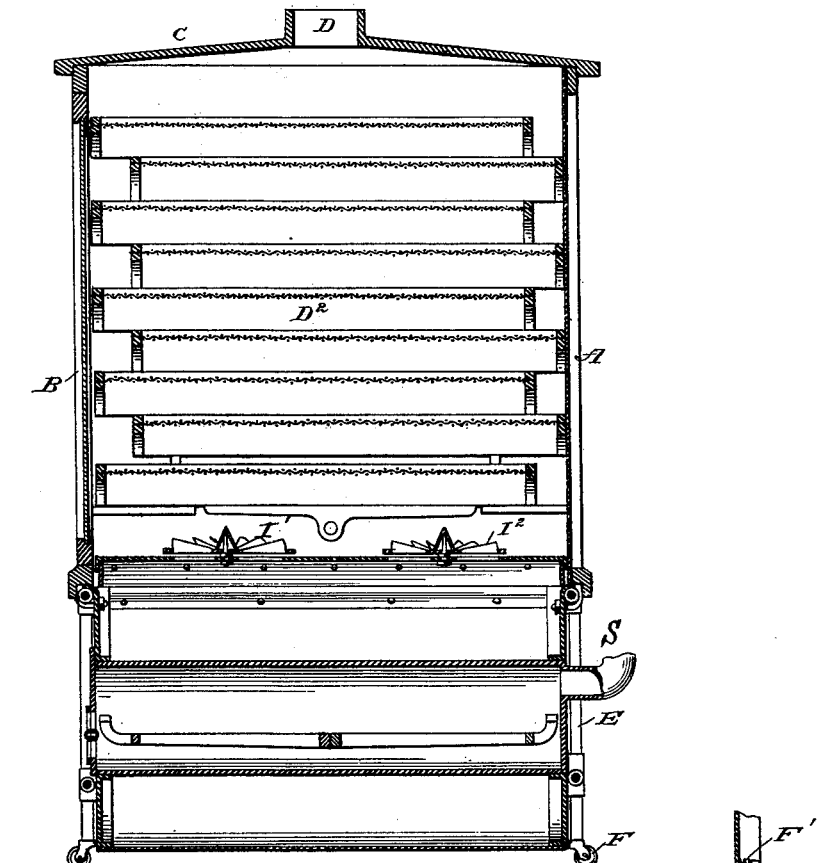
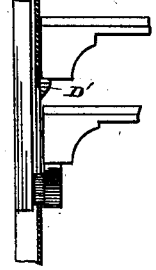
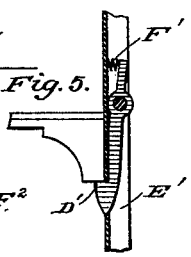
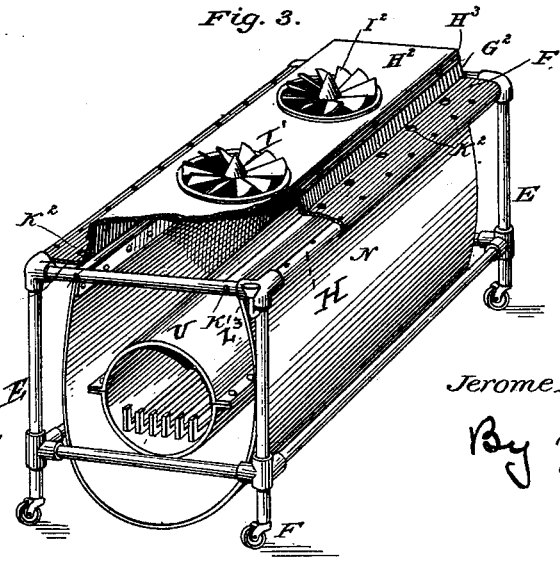
Attest:
R. G. Barnes
E. H. Bradford
Inventor:
Jerome B. Sweetland.
By H. J. Ennis
Atty.

UNITED STATES PATENT OFFICE.

JEROME B. SWEETLAND, OF PONTIAC, MICHIGAN.

FRUIT-DRIER.

SPECIFICATION forming part of Letters Patent No. 233,298, dated October 12, 1880.

Application filed June 9, 1880. (No model.)

*To all whom it may concern:*

Be it known that I, JEROME B. SWEETLAND, a citizen of the United States, residing at Pontiac, in the county of Oakland and State of Michigan, have invented certain new and useful Improvements in Apparatus for Drying Fruit and other Articles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
This invention has for its objects to provide an apparatus for drying fruit and other articles which will be practically fire-proof, by means of which heated air may be supplied to the drying-chamber and distributed throughout the same and over the surfaces of the fruit contained in the trays, and to provide for elevating the trays as the operation of drying progresses, for the successive introduction of trays containing fresh fruit, as more fully hereinafter specified. These objects I accomplish by the apparatus illustrated in the accompanying drawings, in which—

Figure 1 represents a perspective view of my improved drier complete. Fig. 2 represents a vertical section of the apparatus. Fig. 3 represents a detached perspective view of the supporting-frame, casing, and furnace. Fig. 4 represents a detached sectional view, showing the hook and lifter enlarged; and Fig. 5 represents an enlarged sectional view, showing the hook and manner of supporting the tray.

The letter A indicates the drying-chamber or oven of the apparatus, consisting of a frame, B, of wood or other proper material, supporting the walls B', which are composed of sheet metal or any other suitable material.

The letter C indicates the top of the apparatus, which is formed with a short escape-flue, D, to be connected with an elevated flue or chimney, for the purpose of creating a draft through the apparatus. The drying chamber or oven is open at its base or bottom, and is supported upon a frame, E, provided with casters F, by means of which the apparatus may be conveniently moved from place to place.

The said frame is composed of hollow metallic tubes, closed at their lower ends and communicating with each other, the upper horizontal tubes of said frame being perforated, as indicated by the letter K, for the purpose hereinafter explained.

The tubes forming the frame may be connected together in any convenient manner; but in practice I prefer to connect them by means of the longitudinal tubes H, the ends of which are recessed out, so as to fit neatly against the inner sides of the transverse upper horizontal tubes of the frame. Through the said transverse tubes are formed transverse apertures K.

The letter N indicates a curved casing, of metal or other suitable material, located within the supporting-frame of the apparatus, the upper edges of which casing are curved around the longitudinal tubes H, and thereby securely fastened to the same.

The letter P indicates the heads of the casing, which are constructed of cast metal, the forward one being provided with a central opening and door, R, and the rear one with a flanged opening, S, for the reception of a stove-pipe. Both of said heads are provided with semicircular openings T near the bottom for the admission of air to the casing, and are formed with flanges on their inner faces near their edges, over which the ends of the casing fit, and by which said ends are supported.

The letter U indicates a cylindrical fire-box, of metal or other suitable material, extending longitudinally in the casing from the door at the front to the stove-pipe opening at the rear. The casing forms a jacket around the fire-box, the jacket communicating with the open air at each end by means of the openings T, whereby the air to be heated is supplied to the apparatus.

The letter A' indicates a series of parallel studs, secured in groups of two each to the opposite side walls of the oven on the outside, with a space, B², between each group, in which, a short distance above the sill of the oven or chamber, is pivoted a lever, C², having a hook, D', at its lower end, projecting, when the hook is in a normal position, through openings E' in the sides of the oven or drying-chamber, and being held in and returned to such normal position by means of a spring, F', for the purpose more fully hereinafter explained.

The letter G' indicates two parallel studs, secured to the sides of the drying-chamber or oven on the outside, having a space between them, in which is located a movable slide, H', which has a stud, I', at its lower end, projecting inward through a slot in the side of the drying-chamber, the said stud carrying at its end a transverse lifter, L', located close to the inside of the oven or drying-chamber. Two of these slides and lifters are employed, one being located on each side of said oven or chamber, their object being to elevate the trays, as more fully hereinafter explained.

To the upper part of the slides are loosely secured the ends of the levers M', which are fulcrumed at N' to the outside of the oven or drying-chamber, their forward ends being provided with hangers P', having a connecting foot-rail, R', secured to their lower ends, by means of which the slides may be elevated by the foot of the operator. The said hangers are also connected to the rear of the supporting-frame by means of the pivoted rods S', by means of which the said hangers are held and caused to move in proper manner.

The letter T' indicates two auxiliary levers, pivoted at U' to the apparatus, and loosely connected at V' to the slides, the said levers extending forward, and being provided with a connecting hand-rail, W', by means of which they may be operated by hand, in conjunction with the foot-rail, to assist in elevating the slide when the load of fruit in the trays is too heavy to be elevated by the foot of the operator alone.

The letter Z' indicates a cam mounted on a journal, $A^2$, at the side of the apparatus, the face of said cam being adapted to bear against a projecting stud, rod, or pin, $B^3$, secured to the slide. The journal of the cam is provided with a winch or crank, $C^3$, by means of which it can be operated by an attendant to assist in elevating the trays in case they are loaded to an unusual extent or in the case of large machines.

The letter $D^2$ indicates the trays, which are in the form of rectangular pans with raised sides and foraminous bottoms. These trays are somewhat less in length than the depth of the drying-chamber from front to rear, and are adapted to be so located in the drying-chamber that they will be held alternately close up to the front of the chamber and alternately away from the front, as clearly indicated in Figs. 1 and 2, whereby a tortuous passage alternately back and forth throughout the chamber is provided over the surface of the trays for the ascending heated air.

To the upper side rails of the supporting-frame are secured the bent-metal sections $F^2$, which extend upwardly, as shown at $G^2$, and are connected, by a flat plate, $H^2$, with downward flanges $H^3$. The said plate is provided with one or more central openings, which are provided with deflecting-wheels $I^2$. The said plate projects up into the open base of the drying-chamber, and the wheels serve to deflect and distribute the heated air passing from the jacket up into the drying-chamber and insure its uniform action upon the fruit therein. The sections $F^2$ are perforated, as shown at $K^2$, for the passage of cold air on the outside of the chamber or oven to prevent the overheating of the wood-work.

The heads of the casing N may be secured in any suitable manner; but they are preferably attached to the horizontal front and rear rails of the supporting-frame by means of clamps $L^2$, as shown in Fig. 1 of the drawings, so as to set against the ends of the casing and be held thereto when the parts of the apparatus are properly secured.

The operation of my invention is as follows: The hollow tubes forming the supporting-frame are filled with water through a funnel, $L^3$, and fire is started in the furnace or fire-box. The air in the jacket, as it becomes heated, rises and passes up into the drying-chamber through the apertures containing the deflecting-wheels, and by said wheels is deflected and distributed uniformly into the drying-chamber. The door $M^2$ of said chamber being opened, a shelf containing fruit is inserted at the bottom, being run in onto the lifters at each side. As the process of drying progresses, or when the fruit in the tray has been subjected to the heat for a proper length of time, the tray is elevated by depressing the foot-rail until the lifter is elevated by the slide a sufficient distance to pass above the hooks, which will be pressed outwardly by the tray during such passage, when the hooks will be thrown automatically by their springs under the tray, holding it above the bottom of the oven a sufficient distance for the insertion of the succeeding tray. This operation is repeated from time to time as the drying progresses until the drying-chamber is filled with the trays, the trays containing the completely-dried fruit being removed from the top of the apparatus as occasion requires.

During the operation of drying the door of the oven or drying-chamber, as a matter of course, is kept closed, being only opened for the insertion and removal of the trays.

The heat radiated from the jacket during the operation of drying vaporizes the water in the supporting-frame, the steam or vapor escaping through the perforations and saturating the wood-work of the apparatus, rendering the same practically fire-proof, and it is evident that the quantity of vapor generated will be increased according to the intensity of the heat, thus automatically regulating the supply of steam or vapor.

Having thus fully described my invention, what I claim, and desire to secure by Letters Patent, is—

1. In combination with the drying-chamber or oven of an apparatus for drying fruit and other articles, and the furnace thereof, the hollow supporting-frame containing water, and perforated at its upper edges for the escape of vapor to saturate the wood-work, whereby the apparatus is rendered practically fire-proof, substantially as specified.

2. In combination with the casing surrounding the jacket and the supporting-frame, the cast-metal heads, provided with flanges and openings, as described, and secured to the supporting-frame, substantially as and for the purposes specified.

3. In combination with the furnace, its jacket, and the supporting-frame and drying-chamber or oven, the perforated sections and flat connecting-plate provided with one or more apertures, and a deflecting wheel or wheels for distributing the heated air uniformly throughout the drying-chamber, substantially as specified.

4. In combination with the drying-chamber and the hooked levers, the lifters and their lifting-slides, and the levers secured to said slides and provided with hangers connected by a foot-rail, whereby the trays may be elevated by the foot of the operator, substantially as specified.

5. In combination with the lifters, lifting-slides, and the levers with their hangers and foot-rail, the auxiliary levers, and their connecting hand-rail, whereby the operation of lifting may be assisted by hand, substantially as specified.

6. In combination with the lifting-slides and lifters and their respective operating-levers, the cam provided with an operating-crank, whereby the operation of lifting the trays may be assisted by an attendant, substantially as set forth.

In testimony whereof I affix my signature in presence of two witnesses.

JEROME B. SWEETLAND.

Witnesses:
H. J. ENNIS,
CHAS. L. COOMBS.